US008909807B2

(12) United States Patent
Harrang et al.

(10) Patent No.: US 8,909,807 B2
(45) Date of Patent: *Dec. 9, 2014

(54) SYSTEM AND METHOD FOR PROGRESSIVE DOWNLOAD USING SURPLUS NETWORK CAPACITY

(75) Inventors: Jeffrey Paul Harrang, Sammamish, WA (US); David Gibbons, Redmond, WA (US); John Michael Burnette, Seattle, WA (US)

(73) Assignee: Opanga Networks, Inc., Seattle, WA (US)

( * ) Notice: Subject to any disclaimer, the term of this patent is extended or adjusted under 35 U.S.C. 154(b) by 612 days.

This patent is subject to a terminal disclaimer.

(21) Appl. No.: 12/761,302

(22) Filed: Apr. 15, 2010

(65) Prior Publication Data

US 2010/0198943 A1 Aug. 5, 2010

Related U.S. Application Data

(63) Continuation-in-part of application No. 12/395,485, filed on Feb. 27, 2009, which is a continuation of application No. 11/278,809, filed on Apr. 5, 2006, now Pat. No. 7,500,010.

(60) Provisional application No. 60/668,864, filed on Apr. 7, 2005.

(51) Int. Cl.
G06F 15/16 (2006.01)
(Continued)

(52) U.S. Cl.
CPC .......... *H04L 29/06027* (2013.01); *H04L 67/06* (2013.01); *H01L 1/0007* (2013.01);
(Continued)

(58) Field of Classification Search
USPC ................ 709/203, 213, 214, 217, 218, 219, 230,709/231, 232, 233, 234, 235, 236, 237, 238, 709/245, 246, 247, 223, 224, 225, 226, 227, 709/228; 370/395.4, 395.41, 395.42, 412, 370/413, 414, 415, 416, 417, 418, 463, 400, 370/516, 395.1, 396, 470, 472, 473, 474, 370/537, 232, 468, 54, 5, 235, 229, 230.1, 370/230, 233, 252; 711/100, 104, 105, 106, 711/111, 112, 113, 114, 130, 147, 148, 150, 711/151, 153, 163, 165, 166, 170, 171, 711/172; 710/52
See application file for complete search history.

(56) References Cited

U.S. PATENT DOCUMENTS 650,243 A 5/1900 Hart
5,499,238 A * 3/1996 Shon .............................. 370/399
(Continued)

FOREIGN PATENT DOCUMENTS

DE 19831169 1/2000
DE 10208094 9/2003
(Continued)

*Primary Examiner* — Saket K Daftuar
(74) *Attorney, Agent, or Firm* — Michael J. Donohue; Davis Wright Tremaine LLP

(57) ABSTRACT

Systems and methods for providing the progressive download of media content using techniques that preferentially identify and use periods of surplus network capacity to maintain the content delivery. A buffer of a receiving system is maintained and pre-filled with enough content to bridge playback intervals where a network is unable to deliver content as fast as it is played out. Content delivery does not impact other users' applications and use of the network and its resources since content is only sent when surplus network capacity exists in the network. When no surplus network capacity is available, a user requesting content may be given the option to continue the delivery in the background so that the content may be played at a later time. The user may then resume their playback experience once the content has been completely delivered using surplus network capacity as it becomes available.

24 Claims, 5 Drawing Sheets

(51) Int. Cl.
*H04L 29/08* (2006.01)
*H04L 12/801* (2013.01)
*H04L 1/00* (2006.01)
*H04L 29/06* (2006.01)
*H04L 12/835* (2013.01)
*H04L 1/16* (2006.01)

(52) U.S. Cl.
CPC ............. *H04L 47/19* (2013.01); *H04L 1/0002* (2013.01); *H04L 65/80* (2013.01); *H04L 67/30* (2013.01); *H04L 1/1671* (2013.01); *H04L 65/4084* (2013.01); *H04L 47/30* (2013.01); *H04L 1/0038* (2013.01); *H04L 67/325* (2013.01); *H04L 47/10* (2013.01)
USPC .......... 709/232; 709/203; 709/217; 709/218; 709/219; 709/223; 709/224; 709/225; 709/226; 709/227; 709/228; 709/231; 709/233; 709/234; 709/235; 709/236; 709/237; 709/238; 370/232

(56) References Cited

U.S. PATENT DOCUMENTS

| | | | | |
|---|---|---|---|---|
| 5,541,912 A * | 7/1996 | Choudhury et al. | 370/412 |
| 5,541,919 A * | 7/1996 | Yong et al. | 370/416 |
| 5,566,175 A * | 10/1996 | Davis | 370/468 |
| 5,706,281 A | 1/1998 | Hashimoto et al. | |
| 5,706,428 A | 1/1998 | Boer et al. | |
| 5,726,978 A | 3/1998 | Frodigh et al. | |
| 5,974,460 A | 10/1999 | Maddalozzo et al. | |
| 6,034,945 A * | 3/2000 | Hughes et al. | 370/230 |
| 6,038,224 A | 3/2000 | Kim et al. | |
| 6,052,734 A | 4/2000 | Ito | |
| 6,088,360 A * | 7/2000 | Amaral et al. | 370/412 |
| 6,212,567 B1 * | 4/2001 | Thomas et al. | 709/231 |
| 6,230,195 B1 * | 5/2001 | Sugawara et al. | 709/220 |
| 6,311,065 B1 | 10/2001 | Ushiki et al. | |
| 6,327,677 B1 | 12/2001 | Garg et al. | |
| 6,339,785 B1 | 1/2002 | Feigenbaum | |
| 6,366,959 B1 * | 4/2002 | Sidhu et al. | 709/231 |
| 6,377,805 B1 | 4/2002 | Anvekar et al. | |
| 6,453,346 B1 | 9/2002 | Garg et al. | |
| 6,493,875 B1 | 12/2002 | Eames | |
| 6,512,865 B1 | 1/2003 | Shen et al. | |
| 6,529,476 B1 | 3/2003 | Magnussen | |
| 6,560,243 B1 | 5/2003 | Mogul | |
| 6,567,415 B1 | 5/2003 | Elwalid et al. | |
| 6,622,172 B1 | 9/2003 | Tam | |
| 6,651,105 B1 | 11/2003 | Bhagwat et al. | |
| 6,807,429 B2 | 10/2004 | Subrahmanya | |
| 6,845,398 B1 | 1/2005 | Galensky et al. | |
| 6,910,078 B1 | 6/2005 | Raman et al. | |
| 6,912,224 B1 * | 6/2005 | Duault et al. | 370/412 |
| 6,947,388 B1 | 9/2005 | Wagner | |
| 7,050,441 B2 * | 5/2006 | Prakash | 370/395.42 |
| 7,058,723 B2 | 6/2006 | Wilson | |
| 7,076,695 B2 | 7/2006 | McGee et al. | |
| 7,085,576 B2 | 8/2006 | Ranganathan | |
| 7,103,906 B1 | 9/2006 | Katz et al. | |
| 7,240,099 B2 | 7/2007 | Miyazaki et al. | |
| 7,349,337 B1 | 3/2008 | Mahdavi | |
| 7,373,413 B1 * | 5/2008 | Nguyen et al. | 709/231 |
| 7,451,205 B2 | 11/2008 | Chueng et al. | |
| 7,453,897 B2 * | 11/2008 | Enbom et al. | 370/412 |
| 7,454,527 B2 | 11/2008 | Zhang et al. | |
| 7,496,675 B2 | 2/2009 | Obata et al. | |
| 7,512,066 B2 | 3/2009 | Santos et al. | |
| 7,519,030 B2 | 4/2009 | Cimini et al. | |
| 7,533,158 B2 | 5/2009 | Grannan et al. | |
| 7,536,626 B2 | 5/2009 | Sutivong et al. | |
| 7,539,752 B1 | 5/2009 | Chakravarti et al. | |
| 7,543,052 B1 | 6/2009 | Cesa Klein | |
| 7,568,045 B1 | 7/2009 | Agrawal | |
| 7,577,908 B2 | 8/2009 | Frazier et al. | |
| 7,594,260 B2 | 9/2009 | Porras et al. | |
| 7,617,312 B2 | 11/2009 | Tummalapalli | |
| 7,643,461 B2 | 1/2010 | Choi et al. | |
| 7,650,111 B2 | 1/2010 | Dennisson et al. | |
| 7,650,376 B1 | 1/2010 | Blumenau | |
| 7,650,421 B2 * | 1/2010 | Patrick et al. | 709/231 |
| 7,688,733 B1 | 3/2010 | Mirza | |
| 7,698,416 B2 | 4/2010 | Potti et al. | |
| 7,765,324 B2 | 7/2010 | Imiya | |
| 7,839,779 B2 * | 11/2010 | Singla et al. | 370/230.1 |
| 7,895,629 B1 * | 2/2011 | Shen et al. | 725/62 |
| 7,936,672 B2 * | 5/2011 | Skerritt | 370/232 |
| 7,958,532 B2 * | 6/2011 | Paul et al. | 725/90 |
| 7,978,962 B2 * | 7/2011 | Gandolph et al. | 386/354 |
| 8,004,981 B2 * | 8/2011 | Bergamasco et al. | 370/231 |
| 2002/0001287 A1 * | 1/2002 | Bergenwall et al. | 370/230 |
| 2002/0021465 A1 | 2/2002 | Moore | |
| 2002/0081971 A1 | 6/2002 | Travostino | |
| 2002/0091826 A1 * | 7/2002 | Comeau et al. | 709/226 |
| 2002/0097727 A1 * | 7/2002 | Prakash | 370/395.42 |
| 2002/0116555 A1 | 8/2002 | Sommers et al. | |
| 2002/0156910 A1 | 10/2002 | Senda | |
| 2002/0159396 A1 | 10/2002 | Carlson et al. | |
| 2003/0014496 A1 | 1/2003 | Spencer et al. | |
| 2003/0028890 A1 | 2/2003 | Swart et al. | |
| 2003/0084182 A1 | 5/2003 | Mahiddini et al. | |
| 2003/0099195 A1 * | 5/2003 | Lee | 370/229 |
| 2003/0099201 A1 | 5/2003 | Hu et al. | |
| 2003/0145100 A1 | 7/2003 | Marchetto et al. | |
| 2003/0174677 A1 | 9/2003 | Mantha | |
| 2003/0204769 A1 | 10/2003 | Coughlin | |
| 2003/0221008 A1 | 11/2003 | England et al. | |
| 2003/0231655 A1 * | 12/2003 | Kelton et al. | 370/468 |
| 2004/0002362 A1 | 1/2004 | Chuah et al. | |
| 2004/0003105 A1 | 1/2004 | Berzosa et al. | |
| 2004/0015445 A1 | 1/2004 | Heaven et al. | |
| 2004/0017788 A1 | 1/2004 | Shmueli | |
| 2004/0042398 A1 | 3/2004 | Peleg et al. | |
| 2004/0047367 A1 * | 3/2004 | Mammen | 370/472 |
| 2004/0052266 A1 * | 3/2004 | Meyer et al. | 370/412 |
| 2004/0066746 A1 | 4/2004 | Matsunaga | |
| 2004/0117459 A1 | 6/2004 | Fry | |
| 2004/0122969 A1 | 6/2004 | Ameigeiras et al. | |
| 2004/0143652 A1 | 7/2004 | Grannan et al. | |
| 2004/0168052 A1 | 8/2004 | Clisham et al. | |
| 2004/0218563 A1 | 11/2004 | Porter et al. | |
| 2004/0261113 A1 * | 12/2004 | Paul et al. | 725/90 |
| 2005/0030890 A1 * | 2/2005 | Benco et al. | 370/229 |
| 2005/0058138 A1 | 3/2005 | Burcher et al. | |
| 2005/0091395 A1 | 4/2005 | Harris et al. | |
| 2005/0091398 A1 | 4/2005 | Roberts et al. | |
| 2005/0114498 A1 * | 5/2005 | Gonzalez et al. | 709/224 |
| 2005/0128995 A1 | 6/2005 | Ott et al. | |
| 2005/0132049 A1 | 6/2005 | Inoue et al. | |
| 2005/0165948 A1 | 7/2005 | Hatime | |
| 2005/0169184 A1 | 8/2005 | Murgatroyd et al. | |
| 2005/0182848 A1 * | 8/2005 | McNeil et al. | 709/235 |
| 2005/0193069 A1 | 9/2005 | Brown et al. | |
| 2005/0198680 A1 | 9/2005 | Baran et al. | |
| 2005/0239412 A1 | 10/2005 | Kelz | |
| 2005/0256926 A1 | 11/2005 | Muhonen et al. | |
| 2005/0281270 A1 | 12/2005 | Kossi et al. | |
| 2005/0281277 A1 | 12/2005 | Killian | |
| 2005/0282500 A1 | 12/2005 | Wang et al. | |
| 2005/0289630 A1 | 12/2005 | Andrews | |
| 2006/0007856 A1 * | 1/2006 | Berghoff | 370/229 |
| 2006/0019665 A1 | 1/2006 | Aghvami et al. | |
| 2006/0025151 A1 | 2/2006 | Karaoguz et al. | |
| 2006/0026296 A1 | 2/2006 | Nagaraj | |
| 2006/0149850 A1 * | 7/2006 | Bowman | 709/231 |
| 2006/0150055 A1 | 7/2006 | Quinard et al. | |
| 2006/0176824 A1 | 8/2006 | Laver et al. | |
| 2006/0268336 A1 | 11/2006 | Sakaniwa et al. | |
| 2006/0268709 A1 * | 11/2006 | Singla et al. | 370/235 |
| 2006/0277277 A1 | 12/2006 | Landschaft et al. | |
| 2006/0282856 A1 | 12/2006 | Errico et al. | |
| 2007/0025301 A1 | 2/2007 | Petersson et al. | |
| 2007/0066297 A1 | 3/2007 | Jeidari-Bateni | |
| 2007/0086347 A1 | 4/2007 | Reynolds | |
| 2007/0142067 A1 | 6/2007 | Cheng et al. | |

(56) References Cited

U.S. PATENT DOCUMENTS

| | | |
|---|---|---|
| 2007/0165732 A1 | 7/2007 | Gerlach |
| 2007/0211674 A1 | 9/2007 | Ragnar Karlberg et al. |
| 2007/0239695 A1 | 10/2007 | Chakra et al. |
| 2008/0126919 A1 | 5/2008 | Uskali |
| 2008/0161951 A1 | 7/2008 | Morris |
| 2008/0162403 A1 | 7/2008 | Sundaresan |
| 2008/0165693 A1 | 7/2008 | Castro et al. |
| 2008/0195745 A1 | 8/2008 | Bowra et al. |
| 2008/0205291 A1 | 8/2008 | Li et al. |
| 2008/0208963 A1 | 8/2008 | Eyal et al. |
| 2008/0212509 A1 | 9/2008 | Kim et al. |
| 2008/0215873 A1 | 9/2008 | Bobrow |
| 2008/0256272 A1 | 10/2008 | Kampmann et al. |
| 2008/0319833 A1 | 12/2008 | Svendsen |
| 2009/0100469 A1 | 4/2009 | Conradt et al. |
| 2009/0164624 A1 | 6/2009 | Metcalf et al. |
| 2009/0164646 A1 | 6/2009 | Christian et al. |
| 2009/0327512 A1 | 12/2009 | Chapweske |
| 2010/0198943 A1 | 8/2010 | Harrang et al. |

FOREIGN PATENT DOCUMENTS

| | | |
|---|---|---|
| EP | 1587290 | 10/2005 |
| EP | 1622385 A1 | 1/2006 |
| EP | 1841172 | 10/2007 |
| JP | 07336375 | 12/1995 |
| JP | 10124412 | 5/1998 |
| JP | 2005258912 | 9/2005 |
| KR | 102002-0017926 | 3/2002 |
| KR | 20020017926 | 3/2002 |
| KR | 102004-0028401 | 4/2004 |
| KR | 20040028401 | 4/2004 |
| KR | 100438697 | 7/2004 |
| KR | 100645742 | 11/2006 |
| KR | 10-2007-0013600 | 1/2007 |
| KR | 102007-0011811 | 1/2007 |
| KR | 100693023 B1 | 3/2007 |
| KR | 20070053884 | 5/2007 |
| KR | 102007-0117197 | 12/2007 |
| KR | 100807264 B1 | 2/2008 |
| KR | 102008-0039324 | 5/2008 |
| WO | WO 9320637 | 10/1993 |
| WO | WO 0247414 | 6/2002 |
| WO | WO 2004114639 | 12/2004 |
| WO | WO 2005120122 | 12/2005 |
| WO | WO 2006099545 | 9/2006 |

\* cited by examiner

SYSTEM AND METHOD FOR PROGRESSIVE DOWNLOAD USING SURPLUS NETWORK CAPACITY

CROSS REFERENCE TO RELATED APPLICATION(S)

This application is a continuation-in-part of U.S. patent application Ser. No. 12/395,485 filed on Feb. 27, 2009, which is a continuation of U.S. patent application Ser. No. 11/278,809 filed on Apr. 5, 2006, which claims the benefit of U.S. Provisional Application Ser. No. 60/668,864 filed Apr. 7, 2005, the entire disclosures and contents of which are hereby incorporated by reference.

BACKGROUND OF THE INVENTION

1. Field of the Invention

The present invention is directed generally to systems and methods for providing progressive downloading of content over a network, and more specifically, to progressive downloading of content using available surplus capacity of a network.

2. Description of the Related Art

Streaming online content while connected to a network is a popular method of delivering requested media content from networked servers for consumption by a requestor. A familiar problem with streaming online content is that the network connecting the server and a receiver may have transient fluctuations in its ability to deliver the content, resulting in interruptions in the playback (or "playout") session. Various methods have been proposed to mitigate this issue including content compression to reduce the delivery rate, dynamic real-time encoding to reduce the delivery rate/playback-quality to match the network capability, and pre-buffering a short segment of the content before allowing playback to start and thereafter filling the buffer faster than the content can be played out until the end of the playback session. This last streaming method has become known as progressive download (or "PD"), and the technique is intended to build up a safety margin in order to be able to maintain continuous playback during brief intervals when the server is unable to maintain the delivery rate to the receiver over the network.

While designed to reduce and to avoid interruptions, progressive download is not immune to network impairments which persist long enough to empty a buffer on a system receiving the content. In those cases the playback session is forced to halt until the buffer can again be re-filled and the session recommences. It is therefore a common experience that existing progressive download techniques often fail to provide a continuous playback session depending on the capabilities of the network.

Another growing problem is the impact that streaming large content files has on access networks including wired, fiber and wireless types. "Large" media content has the signature feature of consuming significant amounts of time and network resources during its delivery to or from an end user device. Commonly, consumer access networks are designed for delivery of short bursts of data and network resource use and are not intended for long-term continuous use such as streaming media content. Streaming media content is widely acknowledged to be a principal challenge to access network traffic engineers who try to satisfy the peak use demands of many users with limited network resources. The typical outcome of widespread streaming adoption is network congestion which often is exhibited by slow network response for all users and their applications.

DETAILED DESCRIPTION OF THE INVENTION

Figure 1:
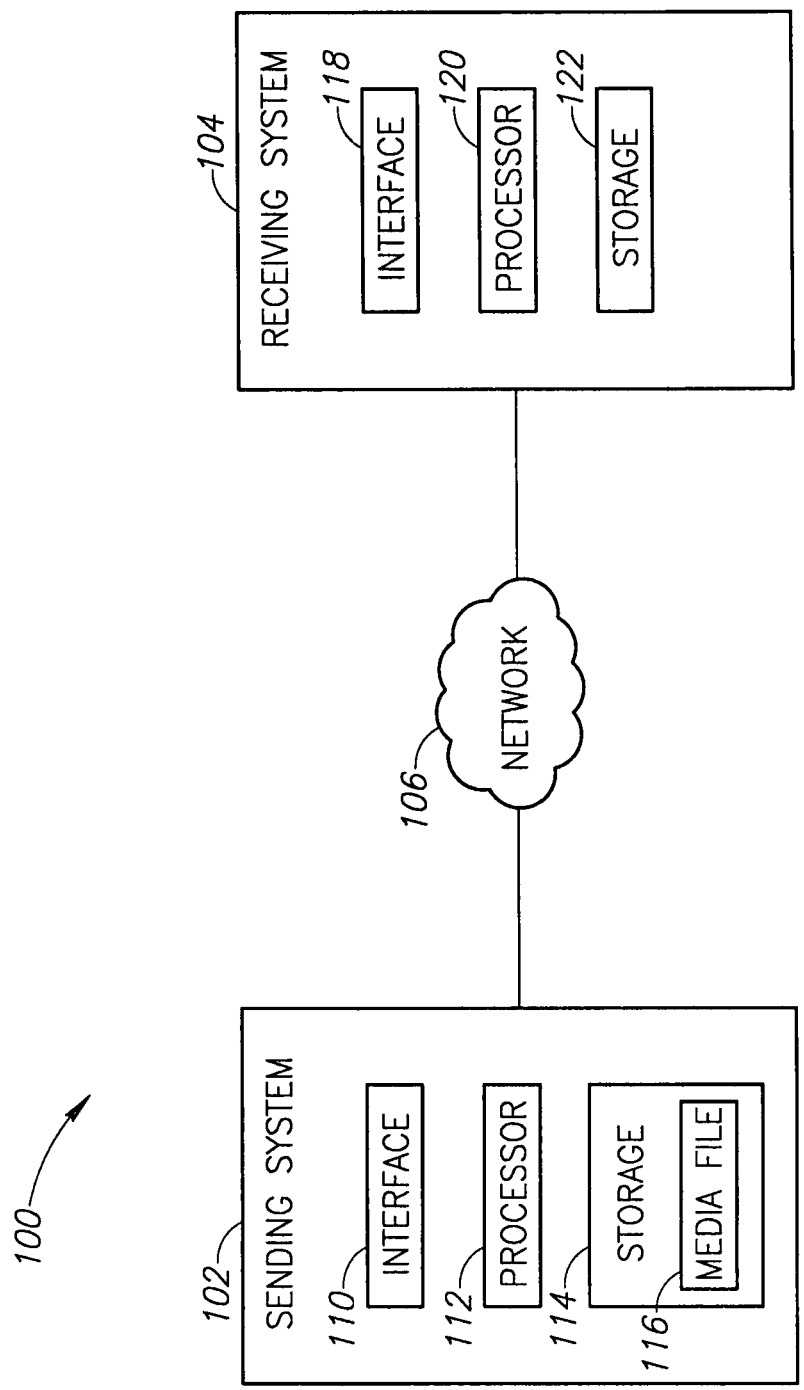
FIG. 1 is a schematic generally representing an implementation of a media content delivery system.

The embodiments described herein are generally directed to systems and methods for providing the progressive download of media content using techniques that preferentially identify and use periods of surplus network capacity to maintain the content delivery. As used herein, the term surplus network capacity is defined as network capacity determined by an access provider to be available in a network in view of the total capacity of a network and the usage of the network. As can be appreciated, the surplus network capacity for a network may vary substantially over time (e.g., during peak use periods) and from one service provider to another. For example, an access provider may set a threshold at a predetermined percentage of a network's total capacity, such as 80% of total capacity. Any time that the network usage falls below 80% of total capacity, the surplus may be used by the delivery system described herein so that the current usage does not exceed the 80% threshold. Another access provider may have the same total capacity, but set the threshold at 90% of total capacity. In this example, any time that the usage falls below 90% of total capacity, the surplus may be used by the delivery system described herein so long as the current usage does not exceed the 90% threshold. The predetermined percentage may be any suitable percentage such as 50%, 90%, 98%, or the like. The surplus network capacity may be expressed as a percentage of total network capacity, as an absolute magnitude, or as any other suitable metric. Further, the surplus network capacity of a network may refer to the free bandwidth in the network as in the example provided above, but the term is not so limited. In some scenarios the surplus network capacity available for use to download content using the methods described herein may be determined using other criteria such as priorities, times of day, historical data, or the like.

Similar to existing progressive download methods, in some embodiments a receiver buffer is maintained and pre-filled with enough content to bridge playback intervals where a network is unable to deliver content as fast as it is played out. A difference however is that the actual content delivery does not impact other users' applications and use of the network and its resources. This is accomplished by only streaming content when surplus network capacity exists in the network. Although pre-filling the receiver buffer may take relatively longer since only surplus network capacity is utilized, this method is less damaging to the network and more likely to succeed towards the goal of uninterrupted playback once playback does begin since at least some surplus network capacity was available to pre-fill the buffer in the first place (i.e., the network is not completely congested).

During extended peak use periods, there may be no such surplus network capacity available. In those scenarios a user requesting content may be given the option to continue the delivery in the background so that the content may be played at a later time. If background delivery is selected, the user can resume their playback experience once the content has been completely delivered using surplus network capacity as it becomes available.

The embodiments described herein generally include systems and methods that execute on a client/server architecture. In some embodiments, client software executes on fixed or portable units including PC's, laptops, netbooks, mobile internet devices, cell phones, or other units.

In some embodiments, the following general sequence of steps is performed. A user operating a receiving system selects a content file for streaming delivery, wherein the streaming of the content file to the receiving system begins. Content is delivered using methods that preferentially identify and use otherwise idle network capacity between the networked sending system and receiving system. The receiving system allows the received content to pre-fill a buffer to a calculated threshold level based on a computed filling rate of the buffer. Upon reaching the threshold level, playback begins. As content arrives it may also be cached onto storage onboard the receiving system. Once playback begins the receiving system may monitor the fill level of the buffer, and if buffer exhaustion occurs or is near to occurring, the user may be alerted and given the option to switch modes to background delivery. Otherwise playback continues until the user pauses the playback or the playback of the content reaches the end. As can be appreciated, if the user chooses to ignore alerts of pending buffer exhaustion, interruptions in playout are likely to occur as the buffer re-fills.

In one scenario, the user of a receiving system connects online via a web browser application to a site that hosts a content delivery server. The user may select a media content title (e.g., a video, audio, or other media file) for streaming delivery and, after a short interval, the media content begins to play on the receiving system via a player application. As the content is being played out on the receiving system the network may become unable to sustain the required delivery rate to keep up with the playback. A short time later, a first user alert may indicate to the user that playback cannot be continued. The user may then be given the option to discontinue the playback and continue the delivery in the background. The user may then accept this option and the playback application terminates. At a later time, a second user alert may be provided to inform the user that the content is now completely downloaded on the receiving system. The user may then re-launch the player application and continue viewing or listening to the content from the point of interruption or from the beginning of the content. Because the content is then stored locally on the receiving system, the network no longer influences the playback and the session may proceed uninterrupted to the end of the content. During both streaming and background downloading, network surplus capacity is used to avoid impacting the quality of service for other users' applications and preserving the network quality of experience.

In another scenario, a user may connect to a server using a receiving system and select a content title for streaming media delivery. After a delay the content may begin to play back on the receiving system. During the playback session the network may occasionally become impaired and the delivery rate may be reduced briefly. Because the user's progressive download application has buffered sufficient content prior to starting the playback, the playback session continues uninterrupted. The delivery of content is achieved preferentially using network surplus capacity to avoid impacting other users' applications and preserving their network quality of experience. This process is transparent to the user and the streaming experience is identical to streaming methods that would otherwise congest the network during peak use periods.

Various techniques for delivering files in a manner that avoids network congestion are disclosed in U.S. Pat. No. 7,500,010, which is incorporated herein by reference in its entirety. As described in detail in that reference, a file may be subdivided into segments for transmission from the sending system to the receiving system. After sending a file segment from the sending system to the receiving system, it is possible to determine a maximum transfer rate available on the network from the sending system to the receiving system as well as determine an actual transfer time for any particular segment. The transfer rate and the file segment size can both be dynamically adjusted based on available bandwidth. If the network becomes congested, the system described in U.S. Pat. No. 7,500,010 can automatically reduce the transfer rate and/or the size of file segments to avoid undesirable network congestion. As greater network bandwidth becomes available, the system described in U.S. Pat. No. 7,500,010 can automatically increase the transfer rate and/or adjust the file segment size accordingly. Thus, the system described in the above-referenced patent senses network congestion and dynamically adjusts the transfer rate and/or file segment size to avoid network congestion.

A content delivery system 100 is shown in FIG. 1 to include a sending system 102 and a receiving system 104 both communicatively linked to a network 106. The sending system 102 may be comprised of a computer system or a plurality of collocated or distributed computer systems such as a servers, databases, storage units, routers, switches, firewalls, or other such devices, connected via fiber, wireline, or wireless means to the network 106. For the sake of clarity, the various components are shown in FIG. 1 as the sending system 102.

The receiving system 104 may be collocated with a DVR, PC, network storage unit, client work station, television set top box, modem, gateway, or other such devices such as a personal data assistant (PDA), portable audio-video player, cellular communication device such as a cell phone or in a dedicated hardware unit. The receiving system 104 may be connected to the network 106 via fiber, wireline, or wireless means. The network 106 may include one or more network components from the Internet or other networks, such as WANs, including but not limited to wired (DSL, cable, powerline), fiber, wireless, satellite, and cellular type networks. The network 106 may include other conventional network components such as but not limited to modems, routers, bridges, gateways, network interfaces, cabled transmissions, wireless transmissions, local area networks (LANs), access networks, provider networks, and peer-to-peer arrangements. The sending system 102 may be configured for sending a media file 116 over the network 106 to the receiving system 104.

The sending system 102 includes an interface 110 to access the network 106, a processor 112, and storage 114 containing the media file 116 to be transmitted over the network to the receiving system 104 and containing one or more modules with instructions to implement content delivery methods. The receiving system 104 includes an interface 118 to access the network 106, a processor 120, and storage 122 to store copies of the media file 116 received from the sending system 102 and to store one or more modules to implement instructions regarding content delivery methods. It is understood that the receiving system 104 may be located at an end user's location or be located at some intermediary network location. For example, the receiving system 104 may comprise an intermediary server operative to serve as a caching module for distributing content geographically closer to a plurality of end users.

Figure 2:
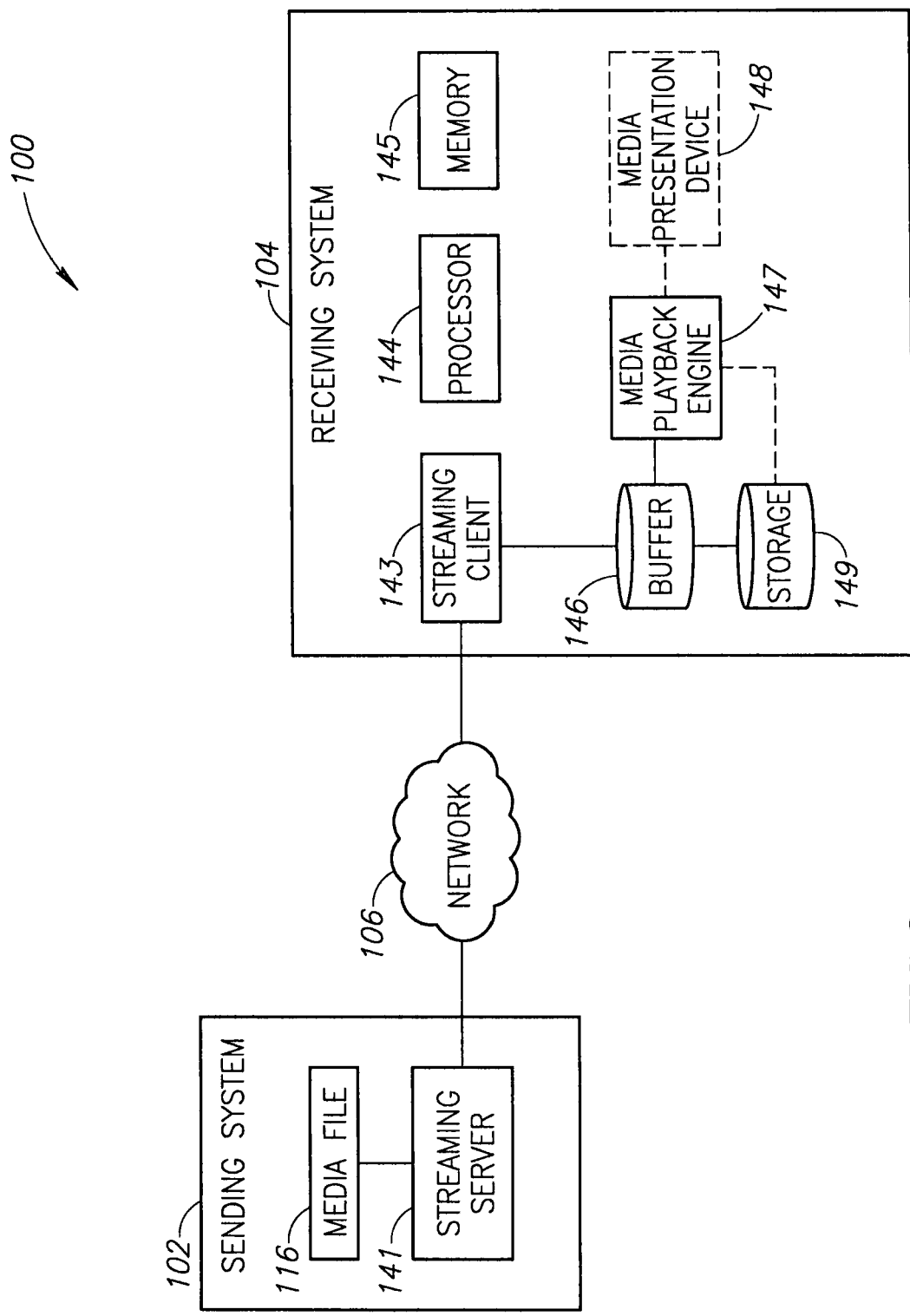
FIG. 2 is a schematic showing a detailed representation of the media content delivery system shown in FIG. 1.

FIG. 2 further illustrates a functional decomposition of the elements of the system 100 provided in some embodiments. As shown, the media file 116 is available to a streaming server 141 of the sending system 102, which is communicatively linked to the receiving system 104 through the network 106. The receiving system 104 includes a computing platform that may in some embodiments include a PC, laptop, netbook, mobile internet device, cell phone, media reader, media player, or other system. It is understood that FIG. 2 shows one grouping of functional elements but that other combinations of elements linked into a common or separate physical units are also possible.

In operation, the incoming media file stream is processed by a streaming client 143 software module of the receiving system 104, which coordinates the transfer with the streaming server 141 over the network 106 using methods that preferentially use surplus network capacity with the goal of not adversely affecting other unrelated traffic sharing the network 106. In some embodiments the transfer of the media file 116 is accomplished using methods further described in U.S. Pat. No. 7,500,010 entitled "Adaptive File Delivery System and Method."

The receiving system 104 shown in FIG. 2 also includes a processor 144 and memory 145 for executing stored software instructions related to the embodiments described herein. The streaming client 143 software module receives the incoming media file 116 from the streaming server 141 of the sending system 102. The streaming client 143 transfers the contents received to a temporary buffer storage 146 and in some embodiments to a mass storage unit 149. A media playback engine 147 takes the content from the buffer 146 and processes it for a media presentation device 148 which may be integrated into the receiving system 104 or in some embodiments may be isolated. For example, in some embodiments the media presentation device 148 may include a separate video display screen and audio speakers.

In some embodiments the media playback engine 147 takes content from the buffer 146 when the buffer reaches a computed pre-fill threshold. The pre-fill threshold may be computed to sustain continuous playback once playback has begun. The pre-fill threshold may be computed based on the buffer fill rate, the content size, the playback rate, and the like.

As can be appreciated, in certain scenarios the buffer 146 may become exhausted such as during periods of extended congestion in the network 106. In these situations a user may elect to continue transferring the media file 116 in the background using surplus network capacity into the local storage 149 of the receiving system 104. Once the media file 116 is completely transferred to the local storage 149, the media playback engine 147 may be used to play back the media file 116 (as depicted by the dashed line between the local storage 149 and the media playback engine 147).

Figure 3A:
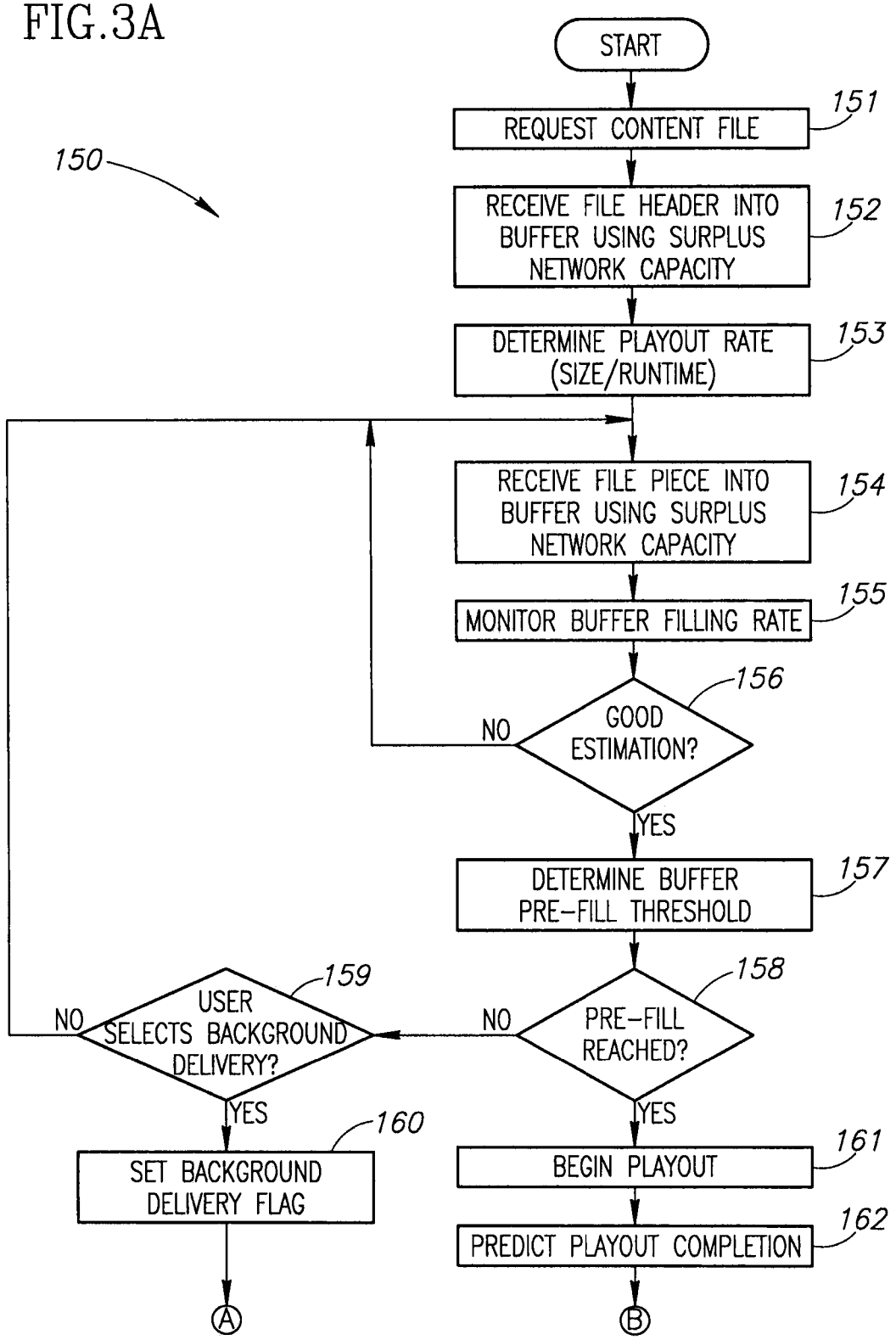
FIGS. 3A-3B are a flow diagram illustrating an exemplary process flow for delivering media content.
Figure 3B:
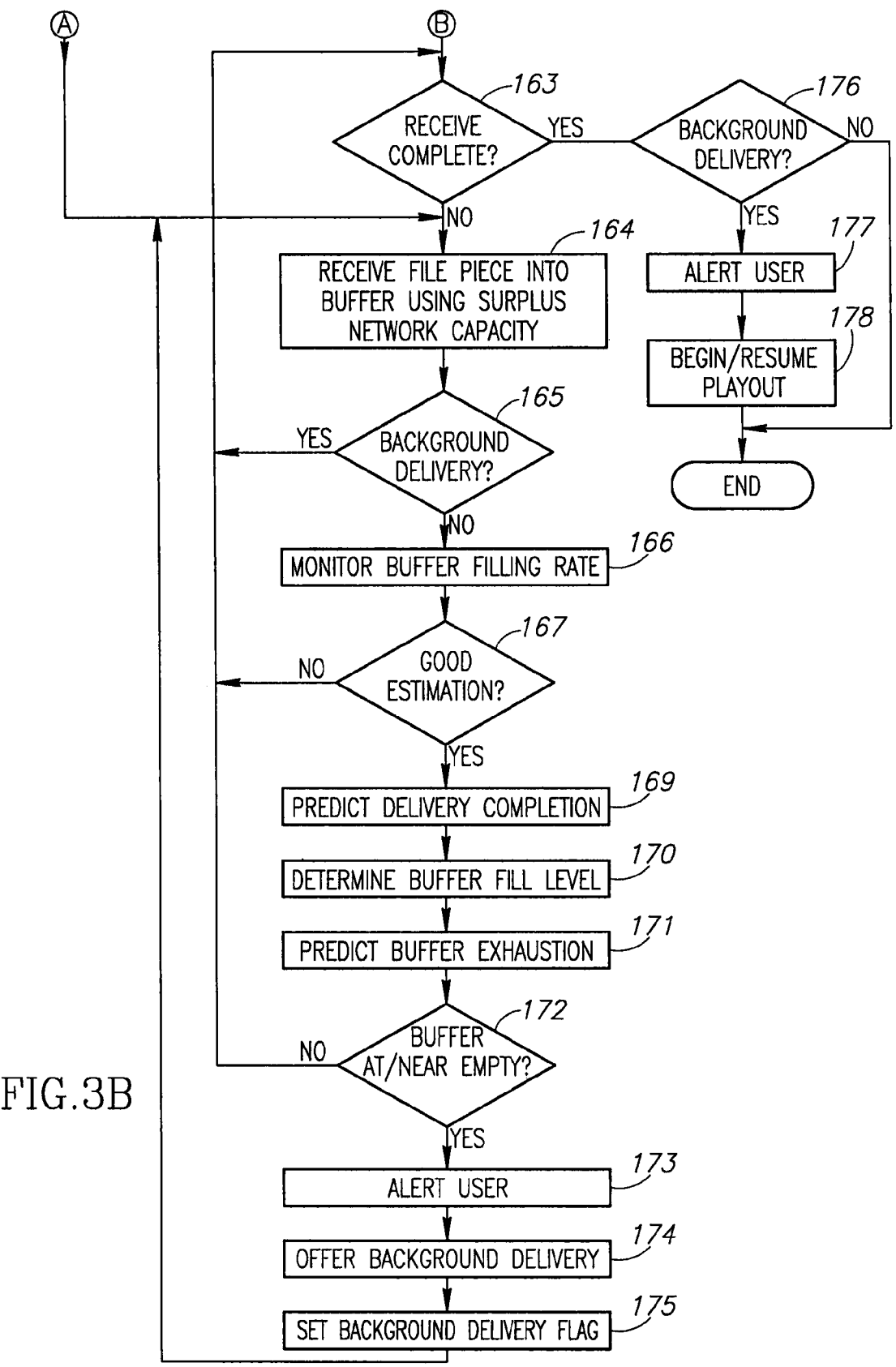

FIGS. 3A-3B illustrate an exemplary process 150 that may be implemented by the system 100 shown in FIG. 2 according to an embodiment of the present disclosure. The process 150 begins when the user, through an application executing on a user's receiving system, requests a media content file (e.g., image, video, audio, or the like) in step 151. In some embodiments this is performed using a web browser application by browsing and selecting a title of a particular media content file. The file streaming begins as the streaming server 141 of the sending system 102 starts to stream content (e.g., the media file 116) to the receiving system 104. A transfer process may be used that preferentially utilizes surplus bandwidth of the network 106 when it is available.

The streaming client 143 provides control and status information to the streaming server 141 that the streaming server 141 uses to control the pace of data flow to the receiving system 104. In one scenario, described in U.S. Pat. No. 7,500,010 entitled "Adaptive File Delivery System and Method," the streaming server 141 determines the maximum average throughput rate of the data flow from the sending system 102 to the receiving system 104, Rmax, which is then enforced by either the receiving system 104 or the sending system 102, for example, by pacing the rate of requests from the streaming client 143 for subsequent portions of the content file being transferred. Rmax can be determined by the streaming server 141 by comparing the uncongested link capacity between the sending system 102 and the receiving system 104 with the throughput reported by the streaming client 143 of the receiving system.

The streaming client 143 may then receive a file header or other metadata from the streaming server 141 prior to the actual file content being transferred to the streaming client in step 152. The header file may be transferred over the network 106 using only surplus network capacity. This header or metadata may include file detail used to signal information to the streaming client 143 that is used to process the progressive download session. In some embodiments the metadata includes the file size, content size and media playout run time. The playout rate may then be determined for example by computing the ratio of the content size to the playout run time in step 153.

The media content received from the sending system 102 using surplus network capacity is then placed into the buffer 146 of the receiving system 104 in step 154. A separate process monitors the filling rate of the buffer in step 155. In some scenarios the filling rate may not be constant and can be averaged in order to obtain a reliable estimate of the filling rate. In some embodiments this averaging may be taken over a certain number (e.g., 5, 10, 25, or the like) of request/receive iterations of the transfers of content file segments between the streaming server 141 and the streaming client 143. In other embodiments the averaging may be accomplished by sampling the total number of bytes of the content file that have arrived in a given time interval.

If a reliable estimate of the buffer filling rate is obtained in decision 156, a buffer pre-fill threshold is determined in step 157. Otherwise, the process 150 continues to receive content into the buffer. As can be appreciated, a separate process (not shown) may copy any content arriving into the buffer into local storage (e.g., the local storage 149) for potential local playout at a later time.

In some embodiments, the buffer pre-fill threshold may be determined by comparing the buffer filling rate (determined in step 155) with the playout rate (determined in step 153). In one embodiment the buffer pre-fill threshold is given by:

$$\text{bufferFill}=\text{MAX}\{\text{contentSize}*[1-\text{fillRate}/\text{playoutRate}],0\}+\text{pad}.$$

It is understood that this estimate may vary over time during the content transfer, for example, as the fill rate varies according to network conditions. Accordingly, the buffer fill level may be over-estimated by a safety factor (i.e., a "pad"), thereby improving the probability of completing an interruption-free playback session. Additional factors including historical transfer performance for the current network attachment point, time of day, and other indications of network ability to complete the transfer may also be factored into the buffer fill level estimation.

When the buffer pre-fill threshold is reached in step 158, content playout is allowed to begin in step 161. For example, playout may be performed using a player application or media playback engine that draws content from the buffer 146. Otherwise, if the buffer pre-fill threshold is not reached, the user may be given the option to select background delivery of the content in decision 159. The option may be presented to the user via an application user interface or in another suitable manner. If the user signals to the streaming client 143 that background delivery mode should be selected, a background delivery flag is set in step 160, and the receipt of the content on the receiving system proceeds without streaming playback in step 164. Otherwise, the buffer continues filling (step 154) until the pre-fill threshold is reached.

Once the buffer pre-fill threshold is reached, the streaming client begins playout from the buffer in step 161. Then, the playout completion time is computed in step 162. If the content file is completely received in decision 163 shown in FIG. 3B, and the user did not select background delivery in step 176, the process 150 ends. If the user selected background delivery in step 176, a first alert may be provided to the user to indicate that the entire file has been stored locally in step 177. The user may then begin or resume playout of the content file in step 178. The user may resume playout of the content file from any point including the beginning of the content file, the point where there playout was stopped due to buffer exhaustion, or any user-selected point in the content file. As can be appreciated, playout may continue until the end of content file or until the user terminates the player application. If the content file is not completely received, the result of decision 163 is NO, and the receiving system 104 continues to fill the buffer 146 with the content file in step 164. A separate process (not shown) may copy any content arriving into the buffer into local storage (e.g., the local storage 149) for potential local playout at a later time.

If the user has selected background delivery in decision 165, the process 150 loops and continues filling the buffer and emptying its contents into local storage. Otherwise, the buffer filling rate is monitored and calculated in step 166. The buffer filling rate may be monitored and calculated as described above with reference to step 155. When a reliable estimate of the filling rate has not yet been obtained, the result of decision 167 is NO, and the process 150 loops back to continue to receive subsequent segments of the content file in step 163. Otherwise, when a good estimate of the filling rate is obtained, the process 150 continues to a delivery completion prediction module in step 169. In some embodiments, the predicted delivery completion time may be obtained by dividing the filling rate by the remaining un-received content file portion.

The buffer fill threshold may then be computed in step 170, and if the current buffer level is substantially below the current buffer fill threshold a determination of buffer exhaustion or imminent exhaustion may be detected in step 171 and decision 172. If the buffer is at or near empty, the user may be alerted (e.g., via an application user interface) and given the option of selecting background delivery mode in step 174. If the user selects background delivery, a background delivery flag is set in step 175, the streaming playback terminates, and the rest of the content file is transferred into local storage by looping through steps 163,164, and 165. Otherwise, the process 150 continues until the content file is completely received and played out or the user terminates the session.

It is understood that if the user chooses to ignore alerts of pending buffer exhaustion that interruptions in playout are likely to occur as the buffer re-fills. One advantage of providing the option to continue receiving the content file with background delivery is to offer the user recourse for later playback from local storage, as opposed to simply requiring the user to terminate the session without receiving the content. Additionally, in some scenarios the content delivery may automatically switch to background delivery upon pending buffer exhaustion, for instance, when a preconfigured policy rule has been pre-selected on the receiving system by the user. As an example, this feature may be beneficial if small children are using the receiving system or it is otherwise inconvenient to solicit/obtain user interaction during playback.

Figure 4:
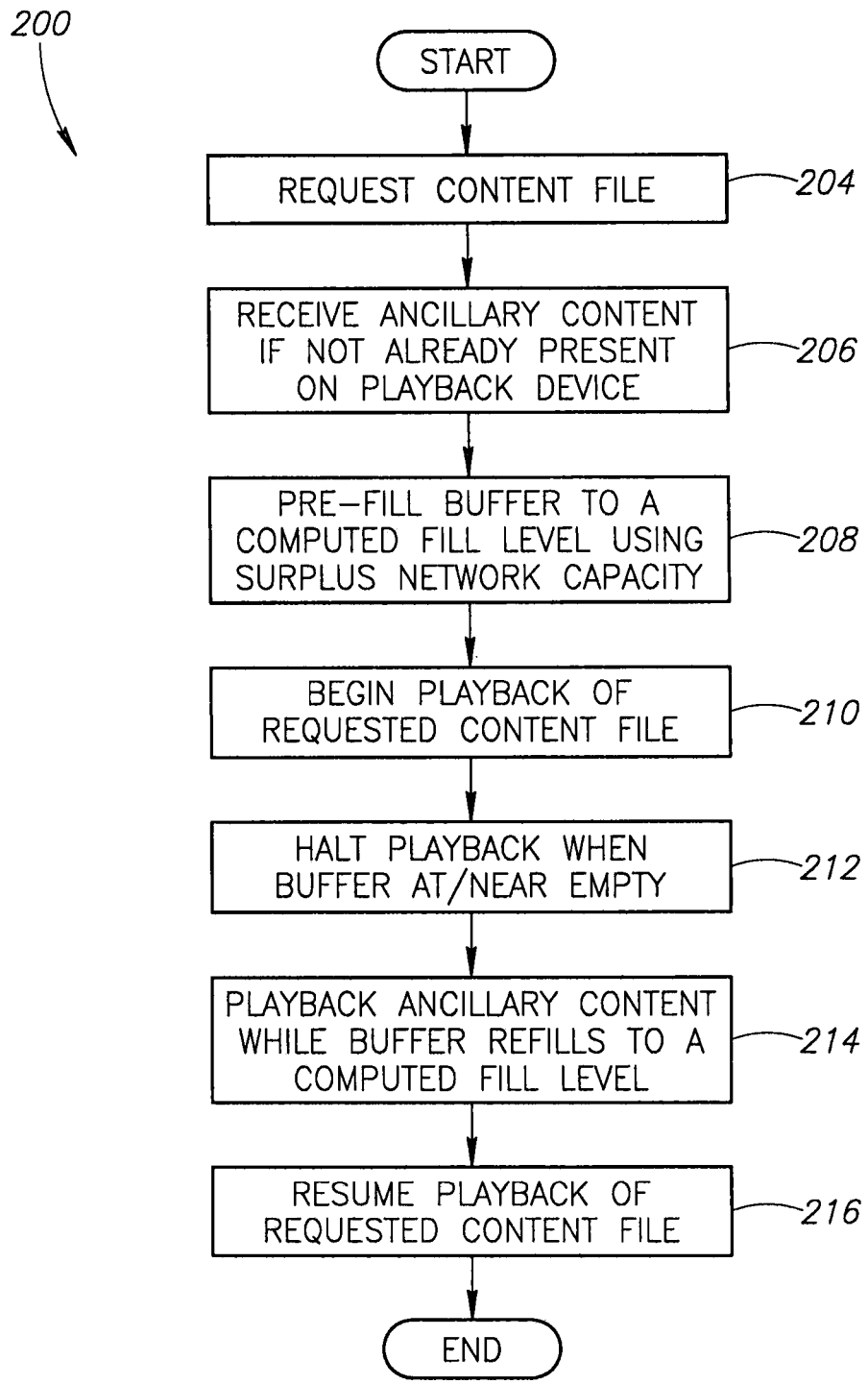
FIG. 4 is another flow diagram illustrating an exemplary process flow for delivering media content.

FIG. 4 illustrates a process 200 that may be implemented by the system 100 shown in FIGS. 1 and 2. Generally, in cases where the playout buffer 146 gets exhausted, ancillary content (e.g., advertising or other content) may be played back during the re-buffering period. The ancillary content may be downloaded to the receiving system 104 after the requested content is requested or at a prior time period. By providing ancillary content during the re-buffering period, the time interval while re-buffering is occurring is utilized rather than simply providing the user with a "re-buffering" status message.

In some embodiments, the user of a receiving system requests a content file from a sending system in step 204. Prior to sending the requested content, in step 206 ancillary content is sent that may be used later to playback during subsequent intervals during re-buffering when the buffer becomes exhausted. Alternatively, the ancillary content may already be resident on the playback device, having been sent during a previous delivery transaction. Next, the buffer may be pre-filled with the requested content to a computed pre-fill threshold using surplus network capacity in step 208. During this 'pre-fill' interval, the playback of the requested content has not yet begun. After the ancillary content has been received and after the buffer reaches the computed fill level, playback of the requested content may begin in step 210. During playback, if network congestion results in exhaustion of the buffer, the playback is halted while the buffer refills in step 212. The user may be presented with an indication that re-buffering is occurring. During the re-buffering interval, previously stored ancillary content is played to fill the time interval in step 214. When the buffer has once again reached its computed fill threshold, playback of the requested content is resumed in step 216. As can be appreciated, once the buffer reaches its computed fill threshold, playback of the requested content may commence immediately. Alternatively, playback of the requested content may commence after the ancillary content is played back to a logical breaking point. As an example, in the case where the ancillary content includes video advertisements, a logical breaking point may be the end of a particular advertisement.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method for transferring content from a sending system to a receiving system, the sending system and the receiving system being part of a network configured to handle a first network traffic and a second network traffic, the second network traffic having a higher priority than the first network traffic, the method comprising:
receiving segments of a requested content file comprising a plurality of segments in a buffer of the receiving system, wherein the segments are sent by the sending system over the network using surplus network capacity, the surplus network capacity being an amount of network capacity determined to be available at a given time period for handling the first network traffic without adversely affecting the second network traffic in the network by sending the segments to the receiving system when surplus network capacity is available and by not sending the segments to the receiving system when surplus capacity is not available;
determining a buffer fill rate for the buffer;
determining a pre-fill threshold for the buffer dependent upon the determined buffer fill rate; and
initiating play out of the requested content file from the buffer after the buffer is filled to the determined pre-fill threshold.

2. The method of claim 1 wherein initiating playout of the requested content file occurs prior to receiving all of the plurality of segments of the requested content file in the buffer.

3. The method of claim 1, further comprising:
monitoring the fill level of the buffer during playout of the requested content file;
determining that the buffer is at or near exhaustion;
providing a first alert to a human user of the receiving system indicating that the buffer is at or near exhaustion;
receiving an instruction from the human user in response to the first alert requesting background delivery of a remainder of the plurality of segments of the requested content file; and
receiving the remainder of the plurality of segments of the requested content file from the sending system in a background delivery mode using surplus network capacity, wherein, in background delivery mode, the segments of the requested content file are received while the receiving system is not simultaneously playing the requested content file thereon.

4. The method of claim 3, further comprising:
providing a second alert to the human user indicating that the remainder of the plurality of segments of the requested content file have been received by the receiving system;
receiving an instruction from the human user in response to the second alert requesting playout of the requested content file; and
playing the requested content file on the receiving system.

5. The method of claim 4 wherein playing the requested content file on the receiving system comprises playing only a portion of the requested content file less than the entire requested content file.

6. The method of claim 3, wherein the first alert is provided to the human user via an application user interface executing on the receiving system.

7. The method of claim 1, further comprising:
monitoring the buffer during playout of the requested content file;
determining that the buffer is at or near exhaustion;
halting playout of the requested content file;
initiating playout of an ancillary content file stored on the receiving system;
receiving additional segments of the requested content file using surplus network capacity during playout of the ancillary content file; and
resuming playout of the requested content file.

8. The method of claim 7 wherein the ancillary content includes advertising content.

9. The method of claim 7, further comprising:
receiving the ancillary content file in the buffer of the receiving system, wherein the ancillary content file is sent by the sending system using surplus network capacity.

10. The method of claim 7 wherein resuming playout of the requested content file occurs after the buffer is filled to the determined pre-fill threshold.

11. The method of claim 7 wherein resuming playout of the requested content file occurs after the buffer is filled to the determined pre-fill threshold and after playout of the ancillary content file has reached a logical breaking point.

12. The method of claim 1 wherein the buffer fill rate is determined by computing an average transmit rate for a plurality of the segments of the requested content file received by the receiving system from the sending system.

13. The method of claim 1 wherein the pre-fill threshold for the buffer is dependent upon one or more of a size of the requested content file, the buffer fill rate, and a playout rate for the requested content file.

14. The method of claim 1 wherein the receiving system comprises a receiving system selected from the group consisting of: a digital video recorder (DVR), a personal computer, a network storage unit, a client work station, a set top box, a personal data assistant (PDA), a portable audio-video player, and a portable communication device.

15. The method of claim 1, further comprising:
providing control and status information to the sending system concerning throughput information for the transfer of the segments of the requested content file; and
receiving segments of the requested content file from the sending system at a rate dependent on the control and status information.

16. The method of claim 1, further comprising:
monitoring the fill level of the buffer during playout of the requested content file;
determining that the buffer is at or near exhaustion;
determining that a human user has pre-selected background delivery by interpreting a preconfigured policy rule set by the human user; and
receiving the remainder of the plurality of segments of the requested content file from the sending system in a background delivery mode using surplus network capacity, wherein, in background delivery mode, the segments of the requested content file are received while the receiving system is not simultaneously playing the requested content file thereon.

17. A receiving system configured to receive content from a sending system, the sending system and the receiving system being part of a network configured to handle a first network traffic and a second network traffic, the second network traffic having a higher priority than the first network traffic, the method, the receiving system comprising:
a buffer;
an interface operative to receive segments of a requested content file comprising a plurality of segments in the buffer, wherein the segments are sent by the sending system over the network using surplus network capacity, the surplus network capacity being an amount of network capacity determined to be available at a given time period for handling the first network traffic without adversely affecting the second network traffic in the network by sending the segments to the receiving system when surplus network capacity is available and by not sending the segments to the receiving system when surplus capacity is not available;
a processor;
a data storage comprising instructions thereon for controlling the receiving system including the processor, interface, and the buffer, the instructions being operative to cause the system to:
determine a buffer fill rate for the buffer;
determine a pre-fill threshold for the buffer dependent upon the determined buffer fill rate; and
initiate playout of the requested content file from the buffer after the buffer is filled to the determined pre-fill threshold.

18. The system of claim 17, wherein the instructions are further operative to cause the system to:
monitor the fill level of the buffer during playout of the requested content file;
determine that the buffer is at or near exhaustion;
provide a first alert to a human user of the receiving system indicating that the buffer is at or near exhaustion;
receive an instruction from the human user in response to the first alert requesting background delivery of a remainder of the plurality of segments of the requested content file; and
receive the remainder of the plurality of segments of the requested content file from the sending system in a background delivery mode using surplus network capacity, wherein, in background delivery mode, the segments of the requested content file are received while the receiving system is not simultaneously playing the requested content file thereon.

19. The system of claim 18, wherein the instructions are further operative to cause the system to:
provide a second alert to the human user indicating that the remainder of the plurality of segments of the requested content file have been received by the receiving system;
receive an instruction from the human user in response to the second alert requesting playout of the requested content file; and
play the requested content file on the receiving system.

20. The system of claim 17, wherein the instructions are further operative to cause the system to:
monitor the buffer during playout of the requested content file;
determine that the buffer is at or near exhaustion;
halt playout of the requested content file;
initiate playout of an ancillary content file stored on the receiving system;
receive additional segments of the requested content file using surplus network capacity during playout of the ancillary content file; and
resume playout of the requested content file.

21. The system of claim 17 wherein the instructions are further operative to cause the system to compute an average transmit rate for a plurality of the segments of the requested content file received by the receiving system from the sending system.

22. The system of claim 17 wherein the pre-fill threshold for the buffer is dependent upon one or more of a size of the requested content file, the buffer fill rate, and a playout rate for the requested content file.

23. The system of claim 17 wherein the receiving system comprises a receiving system selected from the group consisting of: a digital video recorder (DVR), a personal computer, a network storage unit, a client work station, a set top box, a personal data assistant (PDA), a portable audio-video player, and a portable communication device.

24. The system of claim 17, wherein the instructions are further operative to cause the system to:
monitor the fill level of the buffer during playout of the requested content file;
determine that the buffer is at or near exhaustion;
determine that a human user has pre-selected background delivery by interpreting a preconfigured policy rule set by the human user; and
receive the remainder of the plurality of segments of the requested content file from the sending system in a background delivery mode using surplus network capacity, wherein, in background delivery mode, the segments of the requested content file are received while the receiving system is not simultaneously playing the requested content file thereon.

* * * * *